(12) United States Patent
Kolam

(10) Patent No.: US 10,148,735 B1
(45) Date of Patent: Dec. 4, 2018

(54) APPLICATION LAYER LOAD BALANCER

(71) Applicant: Instart Logic, Inc., Mountain View, CA (US)

(72) Inventor: Hariharan Kolam, Palo Alto, CA (US)

(73) Assignee: Instart Logic, Inc., Palo Alto, CA (US)

( * ) Notice: Subject to any disclaimer, the term of this patent is extended or adjusted under 35 U.S.C. 154(b) by 146 days.

(21) Appl. No.: 14/206,344

(22) Filed: Mar. 12, 2014

(51) Int. Cl.
*G06F 15/167* (2006.01)
*H04L 29/08* (2006.01)
*H04L 12/26* (2006.01)
*G06F 17/30* (2006.01)

(52) U.S. Cl.
CPC ........ *H04L 67/10* (2013.01); *G06F 17/30902* (2013.01); *H04L 43/10* (2013.01)

(58) Field of Classification Search
CPC ..... H04L 67/10; H04L 43/10; H04L 67/1031; H04L 41/5019; H04L 67/1012; H04L 47/726

See application file for complete search history.

(56) References Cited

U.S. PATENT DOCUMENTS

| | | | |
|---|---|---|---|
| 7,103,616 B1 | 9/2006 | Harmer | |
| 7,877,461 B1 | 1/2011 | Rimmer | |
| 8,060,402 B1 | 11/2011 | Ranganath | |
| 8,307,099 B1* | 11/2012 | Khanna | H04L 67/22 705/51 |
| 8,819,817 B2 | 8/2014 | Croll | |
| 8,892,687 B1 | 11/2014 | Call | |
| 8,925,054 B2 | 12/2014 | Mays | |
| 2001/0037292 A1 | 11/2001 | Vogt | |
| 2002/0048269 A1* | 4/2002 | Hong | H04L 29/06 370/389 |
| 2003/0028863 A1 | 2/2003 | Reichenthal | |
| 2003/0115575 A1 | 6/2003 | Reyna | |
| 2004/0049579 A1* | 3/2004 | Ims | H04L 67/2823 709/225 |
| 2004/0205149 A1* | 10/2004 | Dillon | G06F 17/30902 709/217 |
| 2005/0021862 A1* | 1/2005 | Schroeder | G06Q 30/02 709/246 |
| 2006/0036875 A1 | 2/2006 | Karoubi | |
| 2007/0005606 A1 | 1/2007 | Ganesan | |
| 2007/0084935 A1 | 4/2007 | Takei | |
| 2007/0180503 A1 | 8/2007 | Li | |
| 2007/0239528 A1 | 10/2007 | Xie | |
| 2008/0109553 A1 | 5/2008 | Fowler | |
| 2008/0235368 A1 | 9/2008 | Nagaraj | |

(Continued)

FOREIGN PATENT DOCUMENTS

| | | |
|---|---|---|
| WO | WO200608515 | 3/2007 |
| WO | WO-2014191968 A1 | 12/2014 |
| WO | WO-20140191968 A1 | 12/2014 |

*Primary Examiner* — Anthony Mejia
*Assistant Examiner* — Stephen J Houlihan
(74) *Attorney, Agent, or Firm* — Van Pelt, Yi & James LLP

(57) ABSTRACT

Responding to a request for network content is disclosed. The request for network content is received. A determination of whether delivery of the content can be improved by a prioritized content delivery system is determined. The determination is determined using application level data associated with the request. The request for network content is routed to the prioritized content delivery system or a normal content delivery system based at least in part on the determination.

19 Claims, 10 Drawing Sheets

(56) References Cited

U.S. PATENT DOCUMENTS

| | | |
|---|---|---|
| 2009/0158140 A1 | 6/2009 | Bauchot et al. |
| 2009/0193513 A1 | 7/2009 | Agarwal |
| 2009/0204541 A1 | 8/2009 | Zhuk et al. |
| 2010/0332993 A1* | 12/2010 | Bousseton ............. G06Q 30/02 715/738 |
| 2011/0179110 A1 | 7/2011 | Soloway |
| 2011/0219057 A1 | 9/2011 | Scoda |
| 2011/0246406 A1 | 10/2011 | Lahav |
| 2011/0251928 A1 | 10/2011 | Van Buskirk |
| 2011/0264787 A1 | 10/2011 | Mickens |
| 2011/0296177 A1 | 12/2011 | Jamjoom |
| 2012/0016933 A1* | 1/2012 | Day ...................... H04L 63/102 709/203 |
| 2012/0131349 A1 | 5/2012 | Layson |
| 2012/0163598 A1 | 6/2012 | Wang |
| 2013/0041946 A1* | 2/2013 | Joel .................. G06F 17/30905 709/203 |
| 2013/0263182 A1 | 10/2013 | Ivy |
| 2013/0275595 A1 | 10/2013 | Hansen |
| 2014/0188839 A1 | 7/2014 | Nielsen |
| 2015/0058945 A1 | 2/2015 | Su |
| 2015/0163087 A1 | 6/2015 | Conner |
| 2015/0271188 A1 | 9/2015 | Call |
| 2016/0028743 A1 | 1/2016 | Johns |
| 2017/0206189 A1 | 7/2017 | Houle |

* cited by examiner

200

```
<html>
  <head>
    <title>Welcome</title>
  </head>
  <body>
    <h1>HelloWorld </h1>
        .
        .
        .
    <img src = "url for image"/>
    <video>
        <source src = "url for video" type = "video/ogg"  />
    </video>
    <script type = "text/javascript">
    <!--script
    ***Some javascript code is placed here ***
    _ >
    </script>

</body>
</html>
```

Script

```
I-> Document
   I-> Element (<html>)
      I-> Element (<body>)
         I-> Element (<div>)
            I-> text node
            I-> Anchor
               I-> text node
         I-> Form
            I-> Text-box
            I-> Text Area
            I-> Radio Button
            I-> Check Box
            I-> Select
            I-> Button
```

FIG. 3

APPLICATION LAYER LOAD BALANCER

BACKGROUND OF THE INVENTION

Typically, a web browser needs to receive the dependent resources associated with different links and URLs before it can complete the rendering of a webpage. The startup wait time experienced by an end-user of a browsing session may be insignificant in low-latency networks, such as wired Ethernet networks, but unacceptably long for an end-user in higher latency networks, such as cellular networks. Additionally, processing time required to generate and provide web content adds to the wait time. Specialized content delivery networks and systems may be utilized to optimize delivery of network content. However for certain types of content, the specialized content delivery networks/systems may be unable to optimize content delivery and consequently hinder performance due to the wasted processing resources attempting to handle content that could not be optimized. Therefore, improved techniques for requesting and delivering content would be desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

FIG. 3 is a diagram illustrating an embodiment of a DOM tree 300.

DETAILED DESCRIPTION

Figure 1:
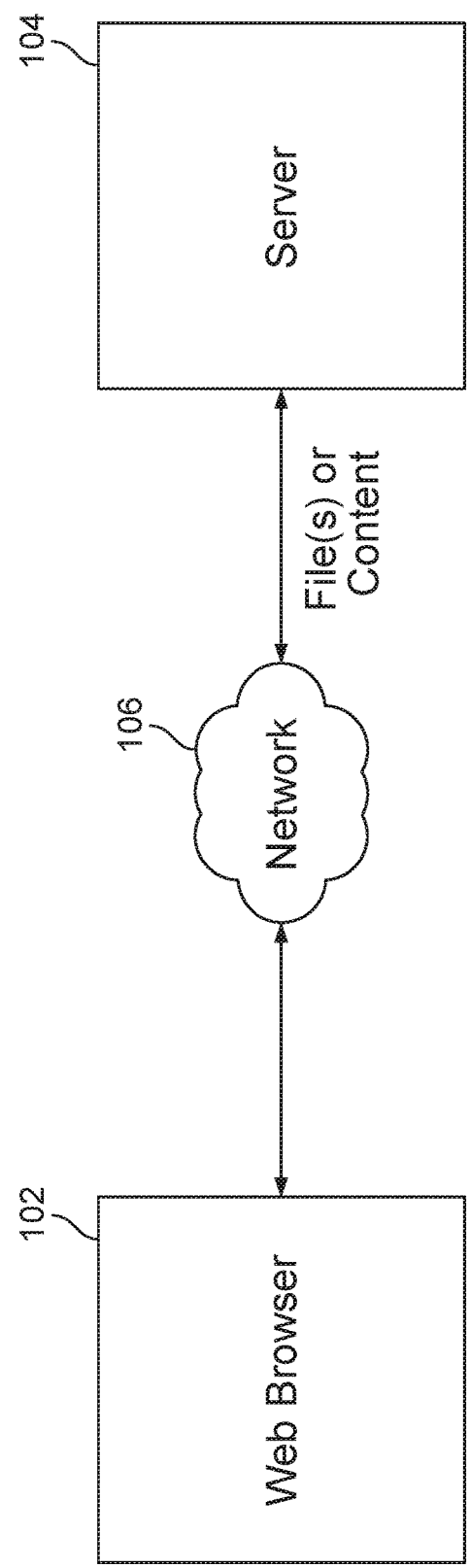
FIG. 1 is a block diagram illustrating an embodiment of a web browser accessing webpages and other information through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficiently routing a request for content is disclosed. In some embodiments, a request for content is received. For example, a request for content of a webpage is received. The request may be received at an application level load balancer of a prioritized content delivery system. For example, the request was routed by a load balancer to the prioritized content delivery system that has been selected by the load balancer to further process the request. It is determined whether delivery of the content can be improved by a prioritized content delivery system. For example, the prioritized content delivery system is able to optimize delivery of certain types of content while unable to optimize delivery of other types of content, and it is determined whether the requested content is the type of content that can be optimized. The determination of whether the content delivery can be improved by a prioritized content delivery system may be performed before the content delivery system consumes significant resources to deliver content that it is unable to optimally deliver. In some embodiments, the determination is made by analyzing application level information associated with the request. For example, the request has been routed by a network load balancer that routed the request based on network level (e.g., Open Systems Interconnection (OSI) model layer 3) information of the request to an application level load balancer of a prioritized content delivery system that performs the application level (e.g., Open Systems Interconnection (OSI) model layer 7) analysis. The request for content is further routed to the prioritized content delivery system or redirected to a normal content delivery system based on the determination. Examples of the normal content delivery system include traditional network servers and/or devices such as an origin server or a content delivery network (CDN) that is able to provide the requested content. Examples of the prioritized content delivery system include network devices and/or servers configured to optimize content delivery as compared to the normal content delivery system.

FIG. 1 is a block diagram illustrating an embodiment of a web browser accessing webpages and other information through a network. As shown in FIG. 1, a web browser 102 is connected to a server 104 through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript, JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components and resources of the webpage in a local memory.

The Document Object Model (DOM) is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document. The DOM standard represents documents as a hierarchy of node objects, called a DOM tree. Some types of nodes may have child nodes of various types, and others are leaf nodes that cannot have any object below them in the document structure hierarchy.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components and resources of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from a uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate GET responses (e.g., N separate HTTP GET responses) are sent to web browser 102, delivering the dependent resources to web browser 102.

The round trip time or network response time for a GET request to arrive at an edge server and for its corresponding GET response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server, then, is approximately 200 milliseconds. To improve network performance, present day browsers have become more efficient in reusing connections to the same server, such that typically less than 20% of the connections may be fresh connections. In some embodiments, HTTP Keep-Alive may be utilized. For example, dedicated connections to edge content delivery systems (e.g., edge proxy servers) may be established and the connections may be reused for various requests. These dedicated connections may be established speculatively by predicting the total number of dedicated connections needed and how to map requests on the connections.

Some networks have relatively higher network latency. For example, the network latency associated with a 3rd generation mobile telecommunications (3G) network is relatively high, e.g., on the order of 100 milliseconds. In this instance, the total network latency associated with receiving the dependent resources associated with the twenty links and/or URLs from the edge server is then on the order of two seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Therefore, improved techniques for delivering information corresponding to a webpage would be desirable.

Figure 4:
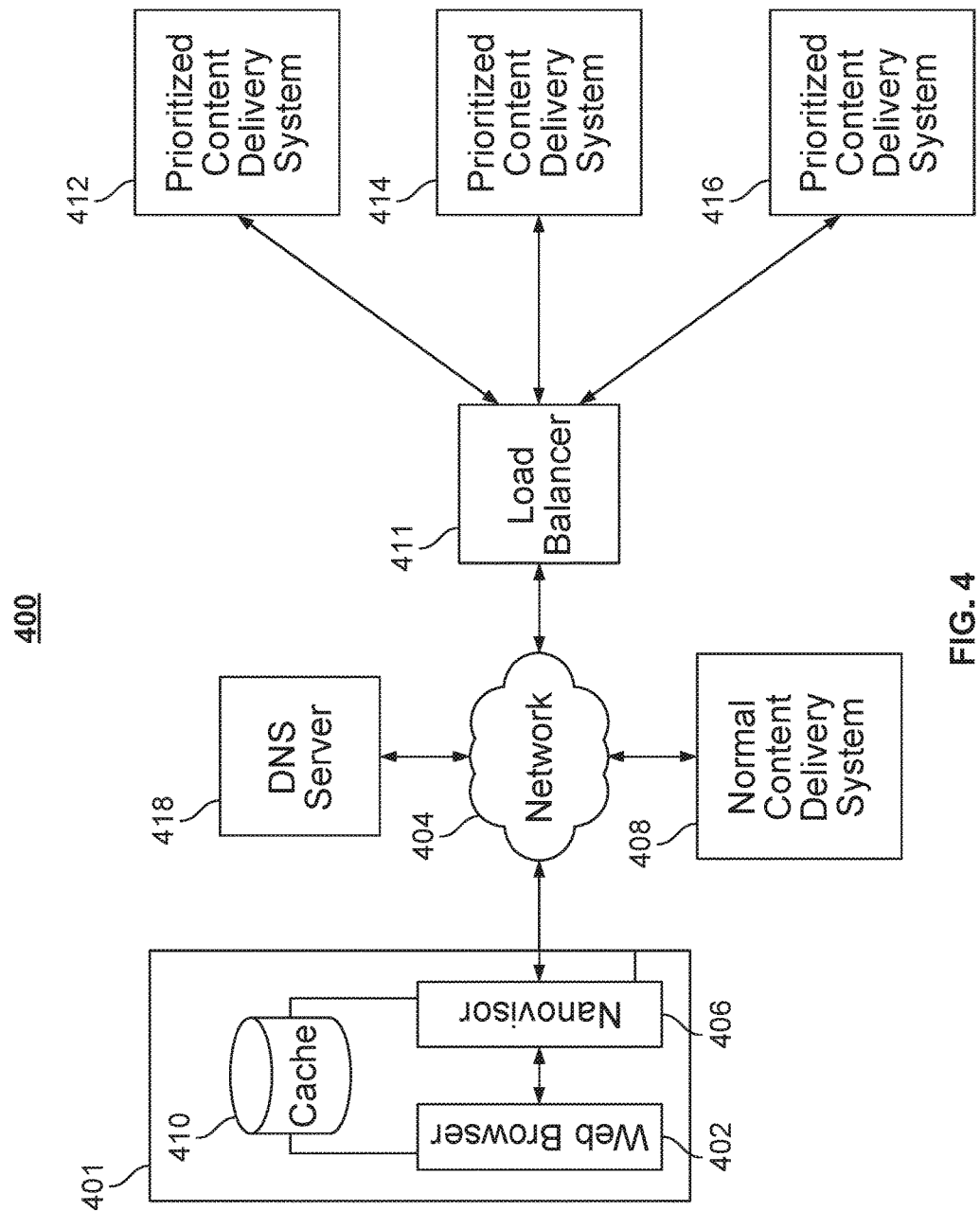
FIG. 4 is a block diagram illustrating an embodiment of an optimized content delivery environment.

FIG. 4 is a block diagram illustrating an embodiment of an optimized content delivery environment. Client-server system 400 may be utilized to efficiently deliver content to a client. Client-server system 400 may be utilized to virtualize a DOM of a web browser. Virtualization of a DOM of a web browser allows the client-server system to take control of the DOM for different kinds of optimizations, while keeping the virtualization transparent to the web browser. Client device 401 includes web browser 402, nanovisor 406, and cache 410. For example, an end-user may utilize client device 401 to access desired network/Internet content. Examples of client device 401 include a desktop computer, a laptop computer, a personal computer, a mobile device, a tablet computer, a smartphone, a wearable computer, and other computing device.

A web browser 402 accesses webpages and other information through network 404. When web browser 402 sends network messages onto network 404 that are related to the downloading of webpages or other information and resources, the messages may be (1) intercepted and processed by nanovisor 406, (2) received and processed by one of prioritized content delivery systems 412, 414, or 416 selected by load balancer 411, or (3) provided directly to normal content delivery system 408. In some embodiments, webpages or other information and resources related to the webpages that are sent to web browser 402 may be intercepted, filtered, processed, or provided by nanovisor 406 or one of prioritized content delivery systems 412, 414, or 416 selected by load balancer 411 (e.g., cached content from normal content delivery system 408 for web browser 402 is routed via nanovisor 406 and/or one of prioritized content delivery systems 412, 414, or 416). Examples of normal content delivery system 408 include an origin server, one or more devices of a CDN, an original content provider system, or any other traditional system for delivering network content.

Load balancer 411 load balances content delivery systems 412, 414, and 416. Although three prioritized content delivery systems have been shown, any number of prioritized content delivery systems may exist. When a content request is received, load balancer 411 may use a load balancing algorithm to select one or more of content delivery systems 412, 414, and 416 to handle the content request. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms can be used. Load balancer 411 utilizes network level data (e.g., OSI layer 3 data) to perform load balancing. Although using higher level data (e.g., application layer data) may result in better load balancing, such analysis is avoided because it would require a large amount of computing resources that would reduce the performance of load balancer 411. Each of prioritized content delivery systems 412, 414, and 416 includes one or more devices that are able to optimize delivery of one or more types of content as compared to delivery by normal content delivery system 408. In some embodiments, one or more of prioritized content delivery systems 412, 414, and 416 includes a proxy server that proxies requested content to be delivered. For example, the proxy server caches content from normal content delivery system 408 and optimizes delivery of the content to a client.

In some embodiments, one or more of prioritized content delivery systems 412, 414, and 416 include an application level load balancer that determines whether a content request should be handled by the prioritized content delivery system or a normal content delivery system.

Delivery of certain types of content (e.g., JPEG images) may be optimized by a prioritized content delivery system whereas other types of content (e.g., ExE executable files) may be unable to be optimized by the prioritized content delivery system. The content to be delivered is initially obtained from one or more traditional normal content delivery systems (e.g., origin server, CDN, normal content delivery system 408, etc.) and the obtained content may be cached and processed to optimize delivery of the obtained content. However for content that is unable to be optimized, the prioritized content delivery system is still able to proxy the requested content by obtaining the requested content from the normal content delivery system and providing the obtained content. Because resources of the prioritized content delivery system are wasted to provide unable to be optimized content, it is desirable to minimize the resources of the prioritized content delivery system consumed to handle content that is unable to be optimized.

Thus when a request is received at a selected load balanced prioritized content delivery system (e.g., one of prioritized content delivery systems 412, 414, 416), an analysis is performed to determine whether delivery of content can be improved by the prioritized content delivery system. For example, higher application level (e.g., OSI layer 7) analysis is performed to determine whether the request is associated with a type of content that is able to be optimized by the prioritized content delivery system. The request for content is further routed to the prioritized content delivery system or diverted to the normal content delivery system based on the determination. For example, if it is determined that the requested content cannot be optimized by the prioritized content delivery system, the request is forwarded to the normal content delivery system to allow the normal content delivery system to handle the request rather than allow the prioritized content delivery system to further handle the request.

In some embodiments, method API calls by web browser 402 or any JavaScript code to manipulate the objects in a DOM tree may be intercepted, processed, or modified by nanovisor 406. Nanovisor 406 may also manipulate the DOM tree by making the appropriate method API calls to the DOM tree. As a result, nanovisor 406 and one or more of content delivery systems 412, 414, and 416 together create a virtualization engine for the DOM of web browser 402. The virtualization engine may access and manipulate a DOM tree, including the creation, deletion, or update of nodes within the DOM tree to enable optimized content delivery using content delivery systems 412, 414, or 416 as compared to normal content delivery system 408.

As compared to the normal content delivery system, the prioritized content delivery systems use different optimization techniques to deliver different types of resources to web browser 102 and speed up the rendering of the webpages in different ways. The optimization techniques include, but are not limited to, HTML streaming, techniques for optimizing the delivery of JavaScripts, techniques for optimizing the delivery of JPEG images, PNG images, WebP images, and the like. Each of the optimization techniques has a set of configurable parameters. The optimization technique for optimizing the delivery of JPEG images is briefly described herein as an illustrative example. However, the present application is not limited to this particular optimization technique only.

The optimization technique for optimizing the delivery of JPEG images includes dividing a JPEG image file into a plurality of segments based on priorities and delivering the segments individually based on priorities. Traditionally, an image in progressive JPEG format is compressed in multiple passes of progressively higher detail. The initial passes include low frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon an HTTP GET for an image, the entirety of the image is downloaded. In some instances, components of the webpage other than the image may have higher priority than the details of the progressively encoded image contained in the subsequent passes, and it would be advantageous to download these important components of the webpage before the high frequency components of the image. Therefore, the optimization technique for delivering JPEG images divides a progressive JPEG image file into a plurality of segments based on priorities, e.g., frequency. Using the virtualization engine, which has control of both ends of the communication in a client and server system, the lower frequency components of the image can be requested by the client and sent by the proxy server first, and subsequently the higher frequency components can be requested by the client and sent by the proxy server dynamically to refresh and sharpen the image at a later time, e.g., after other higher priority components of the webpage have been downloaded.

Virtualization of the DOM of web browser 402 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage without compromising the end-user's experience.

In some embodiments, the virtualization of the DOM of web browser 402 is transparent to web browser 402. In some embodiments, the virtualization of the DOM of web browser 402 is also transparent to the end-users. The end-users are not required to install any plugins. In some embodiments, the virtualization of the DOM of web browser 402 is also transparent to the content publishers, without requiring the content publishers to change any codes.

In some embodiments, nanovisor 406 may be injected into web browser 402 based on standards-based (e.g., HTML, JavaScript, ActionScript, etc.) procedures. For example, after one of prioritized content delivery systems 412, 414, or 416 receives a request from web browser 402 requesting an HTML webpage file, the prioritized content delivery system may parse the HTML webpage file (e.g., obtained from content delivery system 408), inject nanovisor 406 into the HTML webpage file, and then send the response back to web browser 402. In some embodiments, nanovisor 406 may be injected into web browser 402 by a content provider directly. For example, web browser 402 requests an HTML webpage file directly from normal content delivery system 408 and normal content delivery system 408 provides the webpage file with code of injected nanovisor 406. In some embodiments, nanovisor 406 may be injected by adding JavaScript client code in the head section of the HTML webpage file.

In some embodiments, when an initial webpage content (e.g., HTML webpage file) is requested by web browser 402 and received by web browser 402, the received content includes a data mapping of one or more content locations (e.g., uniform resource identifier (URI)/uniform resource locator (URL), IP address, etc.) to corresponding translated content locations. For example, a table of translating initial URIs to translated URIs is received along with the corresponding initial webpage content and code of nanovisor 406. The table may be used to replace a URI of a network resource of the initial webpage to a different translated URI before the external resource is requested via network 404. In some embodiments, the initial webpage content references one or more resources and the resources are to be obtained via network 404 (e.g., from normal content provider system 408 or prioritized content delivery systems 412, 414, 416). As requests for one or more resources of the initial webpage content are generated when web browser 402 is processing the initial webpage content for rendering/display, nanovisor 406 may intercept the request and determine whether a target location address of the resource of the request should be replaced with another location address using the received mapping data. For example, one or more initial content location addresses of resources specified by the intercepted request may be replaced with other location addresses that are (1) associated with a more efficient/faster server that is able to provide the resource and/or (2) associated with different resource(s) or different version(s) of the resource(s) that are to replace initially referenced resource(s). In some embodiments, a location address that references normal content delivery system 408 is to be replaced with a different location address that instead references load balancer 411 (or one or more of prioritized content delivery systems 412, 414, 416).

In some embodiments, when a request for a resource is intercepted, the location address of the request (e.g., URI/URL) is checked using the mapping data (e.g., received table) to determine whether the mapping data includes an entry that maps the location address of the request to a different translated location address (e.g., translated URI/URL). If a matching entry is found, the intercepted request is modified to utilize the translated location address instead and the request is allowed to proceed (e.g., allowed to be requested using network 404). If a matching entry is not found, the request may be allowed to proceed using its original location address. When the request proceeds, it may be subject to another translation process such as conversion of the domain of the translated URI/URL location address to an IP address using a name server (e.g., DNS server 418). The mapping data may be updated periodically and/or dynamically. For example, updates to the mapping data may be received along with a resource that had been requested using a translated location address. In some embodiments, only a portion of resource requests may be subject to being intercepted. For example, only dynamic requests (e.g., request made via JavaScript or other managed programming language) are eligible to be intercepted by nanovisor 406 for analysis and static requests (e.g., requests made via HTML tags) are not eligible to be intercepted for analysis.

Virtualization of the DOM of web browser 402 may include handling static and dynamic interactions with the DOM of web browser 402. Both types of interactions may be intercepted or virtualized by the virtualization engine.

Dynamic interactions with the DOM of web browser 402 include interactions that are affected by JavaScript (e.g., Ajax). The DOM of web browser 402 is virtualized by having nanovisor 406 intercept and virtualize method API calls to create, delete, or update elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine. In some embodiments, one or more resources requested using a dynamic request (e.g., request made via JavaScript) may be intercepted and handled by a client such as nanovisor 406 due to the client's ability to handle and intercept resource requests. For example, nanovisor 406 is able to reorder, prefetch, and/or provide a cached version of one or more resources of a webpage requested using a dynamic request. In some embodiments, a target location address of the dynamic request may be replaced with a translated location address by nanovisor 406 (e.g., using a received translation table) before the request is made via network 404.

Static interactions to the DOM of web browser 402 include interactions corresponding to static HTML tags in an HTML webpage file (e.g., the <img src="url for image"/> tag as shown in FIG. 2). An HTML tag redirects web browser 402 to fetch a dependent resource (e.g., an image file) from a URL. In some embodiments, dependent resources may be referenced using Cascading Style Sheets (CSS). Because the static GET request is not made via a JavaScript, the static request is not intercepted by nanovisor 406. Instead, the static request is sent by web browser 402 in its native form and then routed over the network, e.g., by means of DNS resolution, to load balancer 411 supporting virtualization. In some embodiments, one or more resources requested using the static request may not be intercepted and handled by a nanovisor such as nanovisor 406 due to the nanovisor's inability to handle and intercept resource requests. For example, nanovisor 406 is unable to reorder, prefetch, and/or provide a cached version of one or more resources of a webpage requested using a static tag. In another example, nanovisor 406 is unable to replace a target location address of the static request requested using the static tag.

In some embodiments, prioritized content delivery systems 412, 414, and 416 may discern whether a GET request is sent by web browser 402 or nanovisor 406 using a signature-based scheme, thus enabling prioritized content delivery systems 412, 414, and 416 to handle the static case as mentioned above. For example, if a GET request was sent by nanovisor 406, the GET request would be stamped with a predetermined signature. Conversely, if the GET request was sent directly from web browser 402, as in the static case, the GET request would not be stamped with the predetermined signature.

In some embodiments, when a GET request is sent directly from web browser 402 in a static case, prioritized content delivery systems 412, 414, or 416 may send dummy content in response, causing web browser 402 to create a dummy node in the DOM tree. At the same time, the prioritized content delivery system may also notify nanovisor 406, e.g., by sending a JavaScript, that a dummy node has just been created in the DOM tree, thereby eliminating the need for nanovisor 406 to poll the DOM tree for any new dummy nodes added to the DOM tree. Nanovisor 406, being notified of the newly created dummy node in the DOM tree, may dynamically update the dummy node with the actual content by issuing one or more JavaScript requests to the prioritized content delivery system. In response to the one or more requests, the prioritized content delivery system sends one or more JavaScript updates, which are then intercepted by nanovisor 406, which may then populate the dummy node with the actual image content.

Using the virtualization engine, optimized delivery of information over a network by segmentation and reprioritization of downloaded information can be achieved. Note that the delivery of different information to web browser 402 may be determined by the type of information. For example, dependent resources such as images, audio clips, and videos may be delivered using different techniques that are optimized based on the type of resource. In some embodiments, the virtualization engine may selectively alter or modify the delivery of only certain types of information (e.g., images). Images are used hereinafter as an example of the various dependent resources that can be efficiently downloaded to web browser 402 by the virtualization engine. Note that the examples of downloading images are selected for illustration purposes only; accordingly, the present application is not limited to these specific examples only.

In some other techniques, a compressed image is encoded in a format such that the image file is divided into a series of scans. The first scan shows the image at a lower quality, and the following scans gradually improve the image quality. For example, an image in progressive JPEG format is compressed in multiple passes of progressively higher detail. The initial passes include lower frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon a GET request for an image, the entirety of the image is downloaded. In some instances, components of the webpage other than the image may have higher priority than the details of the progressively encoded image contained in the subsequent passes, and it would be advantageous to download these important components of the web page before the whole image. In some instances, it is preferable to deploy the bandwidth used to download the whole image than to instead download other important components of the webpage. However, such prioritization of webpage content is lost when the image is treated as a single binary content.

Therefore, in some embodiments, the startup wait time can be reduced by dividing a progressive JPEG image file (or other image files that are compressed in multiple passes of progressively higher detail) into a plurality of segments based on priorities, e.g., frequency. Having control of both ends of the communication in a client and server system, the lower frequency components of the image can be requested by nanovisor 406 and sent by edge server 408 first, and then the higher frequency components can be requested by nanovisor 406 and sent by server 408 dynamically to refresh and sharpen the image.

In some embodiments, the segment sizes (e.g., the percentages of the original image file) delivered to web browser 402 in response to the plurality of GET requests may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

In some embodiments, browser cache 410 stores content that can be utilized by browser 402 to render web content instead of obtaining the content via network 404. For example, if the desired content of browser 402 is locally stored in a cache of the machine running browser 402, it would be faster to obtain the content locally rather than via a network request. In some embodiments, one or more resources of a webpage/web content desired to be rendered by browser 402 are preloaded in browser cache 410 prior to the original code of the webpage/web content requesting the resource. Thus when the preloaded content is needed/requested by the original code, the requested content is already in the cache for immediate use rather than requiring a request to be made via a network for the requested content. In some embodiments, one or more resources of a webpage/web content to be preloaded are requested in an optimized order. Obtaining resources in a requested order of the original code of the webpage/web content may not be optimal for rendering the webpage/web content as soon as possible. Often a web browser is limited by a limitation on a maximum number of concurrent connections to a single server. For example, web browser 402 is allowed to maintain up to four connections per server and when web browser 402 needs to obtain more than four resources from a single server, the additional requests for resources from the server must be queued. However, the ordering in which resources are requested affects the total amount of time required to obtain all the resources. In some embodiments, the ordering in which resources should be obtained is reordered and optimized based at least in part on one or more of the following: an order of resources requested in the webpage, an observed order of resources placed in a DOM, sizes of the resources, a maximum number of possible concurrent connections, a parameter/setting of the browser being utilized, a type of browser being utilized, visual importance of the resources, utilization frequencies of the resources, and other properties/information about the resources.

One or more of the following may be included in network 404: a direct or indirect physical communication connection, mobile communication network, Internet, intranet, Local Area Network, Wide Area Network, Storage Area Network, a wireless network, a cellular network, PTSN, and any other form of connecting two or more systems, communication devices, components, or storage devices together. Although example instances of components have been shown to simplify the diagram, additional instances of any of the components shown in FIG. 4 may exist. Components not shown in FIG. 4 may also exist.

Figure 5:
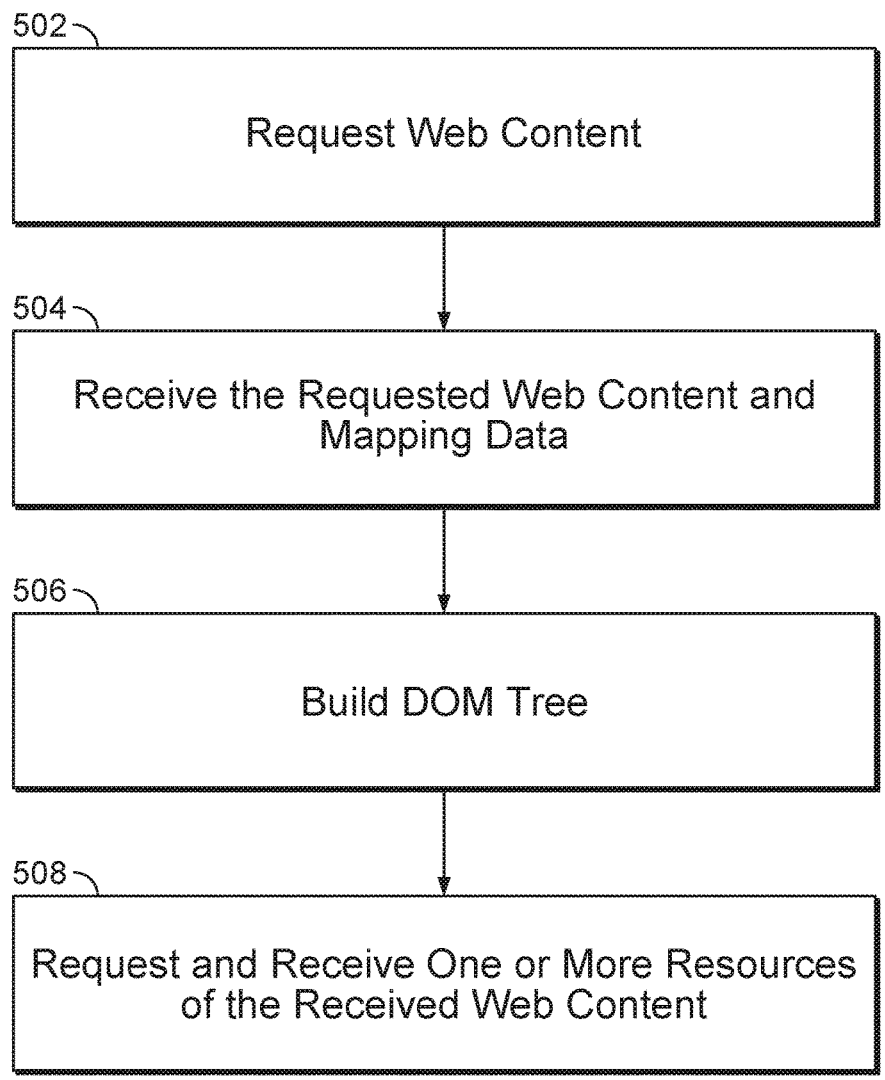
FIG. 5 is a flowchart illustrating an embodiment of a process for translating a location address.

FIG. 5 is a flowchart illustrating an embodiment of a process for translating a location address. The process of FIG. 5 may be at least in part implemented on client device 401, nanovisor 406, and/or web browser 402 of FIG. 4.

At 502, web content is requested. In some embodiments, requesting the web content includes sending an HTTP request message to a server. Examples of the web content include a webpage, a streaming content, a web application, and any other content accessible via the Internet. For example, to display a web content (e.g., webpage 200 as shown in FIG. 2), web browser 402 sends an HTTP request message to a server (e.g., load balancer 411 or normal content delivery system 408) requesting the HTML webpage file corresponding to the webpage. In some embodiments, the request includes an identifier of the requested content that is resolved to another identifier. For example, the request includes a URI (e.g., received from a user that types the URI or selects a link of the URI) and at least a portion of the URI is provided to a DNS server to translate at least a portion of the URI to an IP address to be utilized to request the web content. In some embodiments, the destination of the request is adjusted dynamically using the DNS server. For example, mapping between a domain of a URL of the request and an associated IP address may be modified to modify a destination of the request. In some embodiments, the requested web content is requested by an Adobe Flash application. In some embodiments, the requested web content is requested by a mobile application such as an Apple iOS application or a Google Android application.

At 504, the requested web content and mapping data indicating one or more translated location addresses are received. Examples of a location address include a uniform resource identifier (URI), uniform resource locator (URL), uniform resource name (URN), IP address, domain, domain name, server name, network address, and any other network content identifier. In some embodiments, the received web content includes a component such as nanovisor 406. For example, code for nanovisor 406 of FIG. 4 is inserted into a webpage file included in the obtained web content. The nanovisor may be coded in a managed programming language (e.g., runs in a Common Language Runtime) such as JavaScript, Java, .Net, etc. In some embodiments, the nanovisor may be injected by adding JavaScript client code in the head section of an HTML webpage file included in the web content. In some embodiments, the received web content is received from one of prioritized content delivery systems 412, 414, and 416 and the one prioritized content delivery system received at least a portion of the web content from normal content delivery system 408 and inserted code implementing nanovisor 406 before providing the web content. For example, after one of prioritized content delivery systems 412, 414, and 416 locates the requested HTML webpage file, the one prioritized content delivery system parses the HTML webpage file, injects nanovisor 406 into the HTML webpage file, and then sends the HTML webpage file to web browser 402 in an HTTP response message received at 504. In some embodiments, the received web content is received directly from normal content delivery system 408.

In some embodiments, information and resources that are sent to a web browser that is running code of the client may be intercepted, filtered, processed, or provided by the nanovisor. For example, the nanovisor allows dynamic resource requests of the web browser to be intercepted, reordered, and provided via a browser cache. In addition, method API calls by the web browser or any JavaScript code to manipulate the objects in a DOM tree may be intercepted, processed, or modified by the nanovisor. The nanovisor may also manipulate the web browser's DOM tree by making the appropriate method API calls to the DOM tree. As a result, the nanovisor may be a part of a virtualization engine for the DOM of the web browser. The virtualization engine may access and manipulate a DOM tree, including the creation, deletion, or update of nodes within the DOM tree.

In some embodiments, the received mapping data includes a data structure (e.g., a table, a database, a chart, a hash table, a list, a spreadsheet, etc.). In some embodiments, the received mapping data is encoded in HTML (e.g., encoded using HTML tags). In some embodiments, the received mapping data is encoded in JavaScript Object Notation. In some embodiments, by utilizing the mapping data, one or more content location addresses of the web content may be dynamically modified. By modifying the content location address, referenced content may be replaced with different/modified content and/or provided from a different location. The received mapping data includes one or more entries mapping an initial location address to a translated location address. For example, a mapping data entry maps an initial URI/URL to a translated URI/URL. In another example, a mapping data entry maps an initial URI/URL to a location address that includes an IP address. The mapping data corresponds to the received web content. For example, the received mapping data includes one or more entries that correspond to one or more location addresses referenced by the web content. The mapping data may include an entry that maps a location address of a dynamic resource request (e.g., resource requested using JavaScript) to a translated location address. The initial location address of the web content to be translated using the mapping data may be a dynamically generated location address. For example, the initial location address was generated from execution of a web application (e.g., programmed using a web programming language) of the received web content.

In some embodiments, the web content and the mapping data is received together as a single received content. In some embodiments, the web content and the mapping data are received from the same server. In some embodiments, the web content and the mapping data are received separately. For example, the web content is first received and a nanovisor included in the web content requests/receives the mapping data. In some embodiments, the web content and the mapping data are received from different servers. In some embodiments, the received mapping data is stored in a client device such as client device 401 of FIG. 4. For example, the mapping data is stored in cache 410 and/or another storage/cache of web browser 402 and/or nanovisor 406.

At 506, a DOM tree is built. In some embodiments, web browser 402 parses an HTML webpage file of the received web content and builds a DOM tree to represent the various components of webpage 200 of FIG. 2 in a local memory. For example, when the image tag (shown as <img src="url for image"/> in FIG. 2) is parsed by web browser 402, the image is represented as an image object, and the image object is inserted into the DOM tree accordingly. After the DOM tree is created, the DOM tree is traversed to retrieve any dependent resources indicated by any of the nodes in the DOM tree via a network. For example, the image object corresponding to the static image tag in webpage 200 redirects web browser 402 to fetch an image file from a URL.

At 508, one or more resources of the received web content are requested and received. The received resources may be utilized to populate the DOM and/or provide/render content to a user. In some embodiments, requesting one or more resources includes intercepting a request for a resource of the web content. For example, a component such as nanovisor 406 intercepts requests for one or more resources of the web content before the request is made via the network. In some embodiments, only dynamic requests (e.g., requests for network resources made using a managed programming language) are eligible to be intercepted and modified by a client device to utilize a translated location address instead of an initial location address. In other embodiments, any location address of a network resource of the web content may be modified by a client device to utilize a translated location address instead of an initial location address.

A location address of the intercepted request may be replaced with a translated location address determined using the received mapping data. By using the translated location address, an initially referenced content may be replaced with a different/modified content and/or requested using a different server. In some embodiments, a location address of a network resource request is used to search a data structure that includes the received mapping data. If an entry that matches the location address of the network resource request is found, the location address of the network resource requested is modified using a corresponding translated location address specified by the matching entry. For example, the entry maps an initial URI/URL to a translated URI/URL and the matching initial URI/URL of the network resource request is replaced with the translated URI/URL. In another example, a mapping data entry maps an initial URL to a location address that includes an IP address. If a matching entry is not found in the data structure, the initial location address without replacement or translation may be utilized. In some embodiments, if a matching entry is not found in the data structure, the initial location address is modified using a standard default translation. For example, a default translation policy specifies at least a portion of a location address (e.g., domain of the URI) to be replaced with another identifier.

In some embodiments, once the location address of a resource request has been analyzed and replaced with a translated location, if appropriate, the resource is requested via the network. In some embodiments, the location address of a resource request is not replaced with a translated location before the resource is requested via the network.

Figure 6:
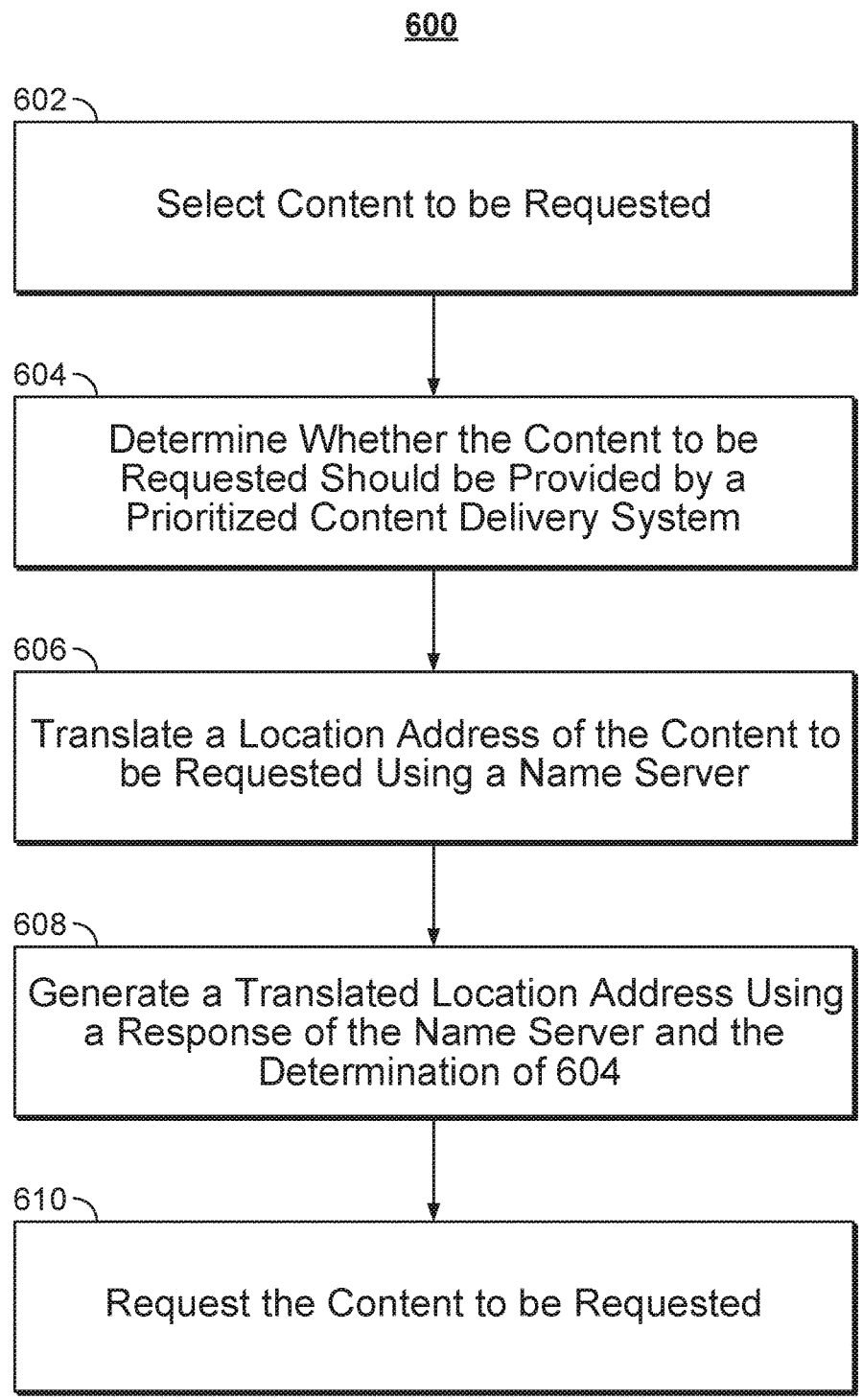
FIG. 6 is a flowchart illustrating an embodiment of a process for requesting content.

FIG. 6 is a flowchart illustrating an embodiment of a process for requesting content. The process of FIG. 5 may be at least in part implemented on client device 401, nanovisor 406, and/or web browser 402 of FIG. 4. In some embodiments, at least a portion of process 600 of FIG. 6 is included in 502 and/or 508 of FIG. 5.

At 602, content to be requested is selected. In some embodiments, selecting the content to be requested includes selecting content to be requested via a network (e.g., network 404 of FIG. 4). The selected content to be requested may include the web content requested in 502 and/or one or more web content resources requested in 508 of FIG. 5.

At 604, it is determined whether the content to be requested should be provided by a prioritized content delivery system. In some embodiments, a component such as nanovisor 406 of FIG. 4 determines whether the content to be requested is a type of content that can be optimized for delivery by a prioritized content delivery system as compared to a normal content delivery system. For example, nanovisor 406 determines whether the content to be requested is better provided by one of prioritized content delivery systems 412, 414, and 416 because it is able to optimize delivery of the requested content or normal content delivery system 408 of FIG. 4 because it is unable to optimize delivery of the requested content.

In some embodiments, determining whether content to be requested should be provided by the prioritized content delivery system includes determining information about the content to be requested rather than making an explicit determination on whether the content to be requested should be provided by the prioritized content delivery system. For example, information that can be utilized to make the explicit determination is identified.

In some embodiments, determining whether content to be requested should be provided by the prioritized content delivery system includes determining one or more of the following: a type of the content to be requested, which process/program/application requested the content, how the requested content will be utilized, destination process/program/application of the requested content, information about a previous request of the requested content, and information about other content requested in conjunction with the requested content. In an alternative embodiment, step 604 is optional.

At 606, a location address of the content to be requested is translated using a name server. For example, a URI of the content to be requested is translated using DNS server 418 of FIG. 4. In some embodiments, a domain name of the location address is translated in to an IP address by locating an entry of the DNS server that maps the domain of the location address to an IP address. In some embodiments, by modifying an entry of the name server that maps the location address to the IP address, redirection is achieved. For example, the location address (e.g., URI) should map to an IP address of a normal content delivery system (e.g., system 408 of FIG. 4), but entry of the name server maps the location address to an alternate virtual IP address (e.g., IP address of load balancer 411 of FIG. 4) to allow remapping of the content address (e.g., remapping of a domain of the location address) to an alternative destination to allow content delivery optimization.

Thus, by modifying DNS entries, an entire domain of where content is to be requested and provided is redirected. However in some cases, selective redirection may be desired. For example, certain types of content may be more efficiently provided by the servers (e.g., prioritized content distribution systems) of the redirected destination and other types of content may be more efficiently provided by the servers of the original destination (e.g., normal content distribution system). If a DNS entry is modified to redirect an entire domain, the redirected destination must handle all content requests of the domain and it is desirable for the redirected destination to efficiently redirect content requests that it is unable to fully optimize.

At 608, a translated location address is generated using a response of the name server and the determination of 604. For example, a URI of the content to be requested is modified to replace a domain of the URI with an IP address determined in 606 and a parameter/query string that encodes data determined in 604 (e.g., data to be passed from nanovisor 406 to a prioritized content delivery system) is inserted in the URI to generate the translated address. The parameter/query string encoded data may allow the recipient to determine whether the requested content should be provided by the prioritized content delivery system. In some embodiments, the translated location address is generated without using the determination of 604.

At 610, the content to be requested is requested using the translated location address. For example, a network request for content located at the translated location address is sent.

Figure 7:
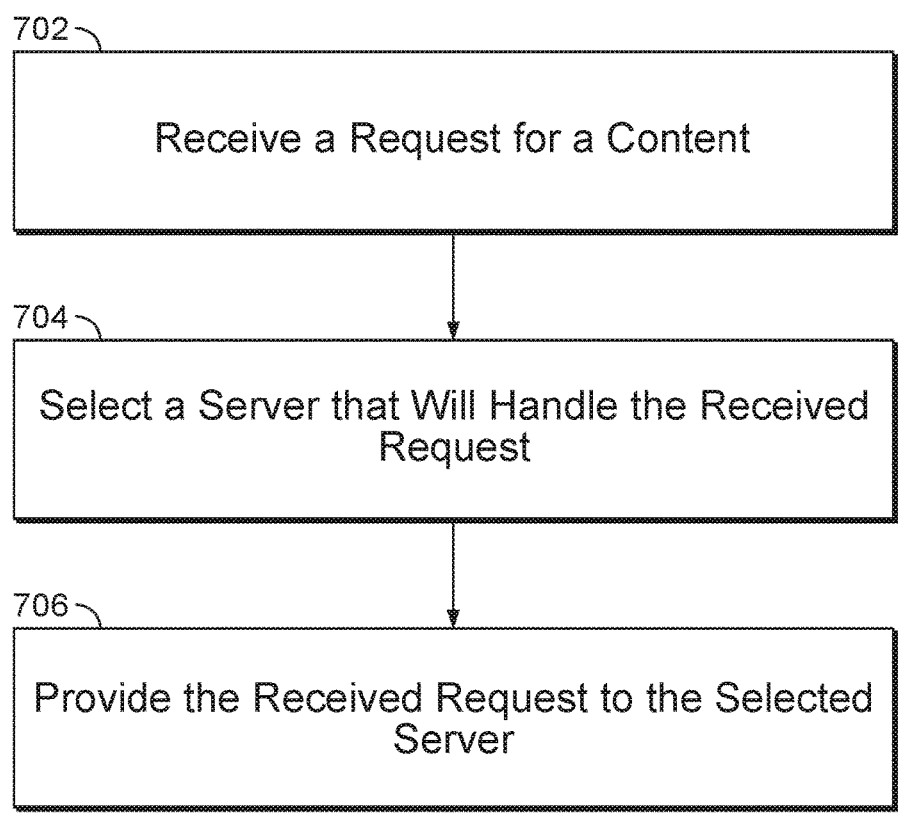
FIG. 7 is a flowchart illustrating an embodiment of a process for requesting content.

FIG. 7 is a flowchart illustrating an embodiment of a process for requesting content. The process of FIG. 7 may be at least in part implemented on load balancer 411 of FIG. 4.

At 702, a request for content is received. In some embodiments, the received request is the request sent in 502 of FIG. 5, 508 of FIG. 5, or 610 of FIG. 6.

At 704, a server that will handle the received request is selected. For example, a selected prioritized content delivery system is selected among a plurality of prioritized content delivery systems (e.g., proxy servers) load balanced by a load balancer. In some embodiments, the selected server is selected using a load balancing algorithm. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms may be used. In some embodiments, the server is selected using network level data (e.g., OSI layer 3 data) of the request. Examples of the network level data includes packet header, source IP address, source port number, destination IP address, destination port number, network protocol, etc. Although using higher level data (e.g., application layer data) may result in better load balancing, such analysis is avoided because it would require a large amount of computing resources that would reduce the performance of a load balancer.

At 706, the received request is provided to the selected server. For example, at least a portion of the received request is forwarded to the selected server.

Figure 8:
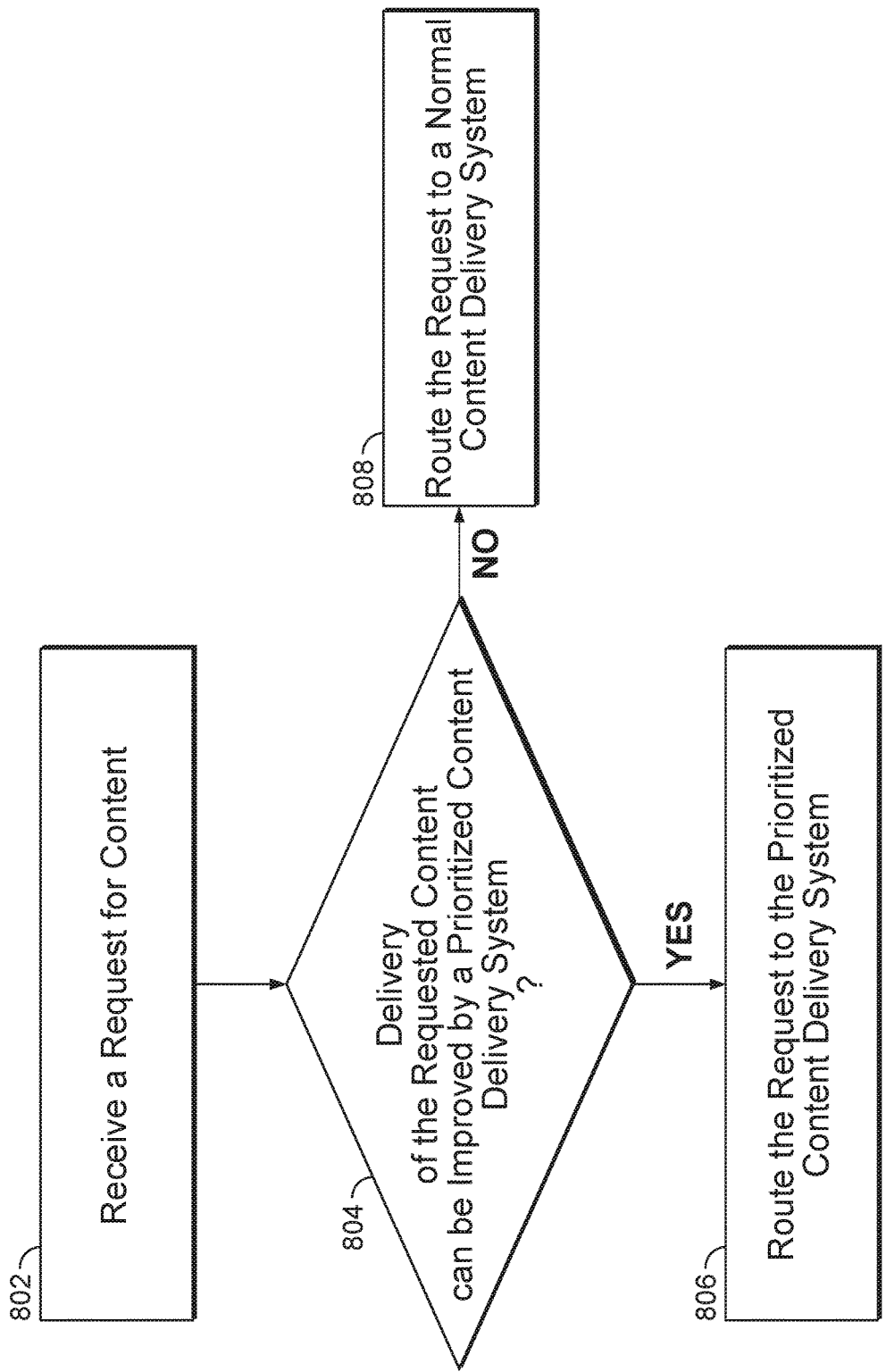
FIG. 8 is a flowchart illustrating an embodiment of a process for routing a content request.

FIG. 8 is a flowchart illustrating an embodiment of a process for routing a content request. The process of FIG. 8 may be at least in part implemented on a component of a prioritized content delivery system (e.g., a component of prioritized content delivery systems 412, 414, or 416) or a component/device connected to a prioritized content delivery system. In some embodiments, the process of FIG. 8 is at least in part implemented on a receiver component (e.g., application level load balancer) of a prioritized content delivery system that analyzes an incoming request (e.g., analyzing requests coming through port 80 and/or 443) to determine whether the request should be further handled by the prioritized content delivery system or redirected to another content delivery system before the received request is routed to a proxy server of the prioritized content delivery system.

At 802, a request for content is received. In some embodiments, the received request is the request sent in 502 of FIG. 5, 508 of FIG. 5, 610 of FIG. 6, or 702 of FIG. 7. For example, the received request is a request for content located at a URI that has been translated using a DNS server and load balanced by a load balancer using network layer information of the request.

At 804, it is determined whether the delivery of the requested content can be improved by a prioritized content delivery system. In some embodiments, the determination is determined at least in part by analyzing application level (e.g., OSI layer 7) information of the received request. In some embodiments, analyzing application level information includes analyzing one or more of the following associated with the received request: a location address of the requested content, a URI of the request, information provided by an application (e.g., web browser) that requested the content, accept-encoding information, header information, information encoded in a parameter/query field of a location address of the request, and information provided by a nanovisor of a sender of the request. In some embodiments, it is determined whether the delivery of the requested content can be improved by a prioritized content delivery system based at least in part on a type of the requested content. For example, certain types of requested content should be provided by the prioritized content delivery system because the prioritized content delivery system is able to optimize delivery of the requested content over a normal content delivery system and for certain other types of content, the content should not be provided by the prioritized content delivery system because the prioritized content delivery system is unable to optimize delivery of the requested content. Application level information of the received request may be used to determine a type of requested content. In various embodiments, the specification of content types that can be delivered by a prioritized content delivery system in an optimized manner may be preconfigured, dynamically configured, and/or dynamically updated.

If at 804 it is determined that the delivery of the requested content can be improved by the prioritized content delivery system, at 806, the request is routed to the prioritized content delivery system. For example, the request is further routed to a component (e.g., a proxy server) of the content delivery system that will provide the requested content to the requestor.

If at 804 it is determined that the delivery of the requested content cannot be improved by the prioritized content delivery system, at 808, the request is routed to a normal content delivery system. For example, the request is redirected to normal content delivery system 408 of FIG. 4. In some embodiments, redirecting the request includes redirecting/forwarding the request to another location address (e.g., URI/URL) that points to the normal content delivery system.

Figure 9:
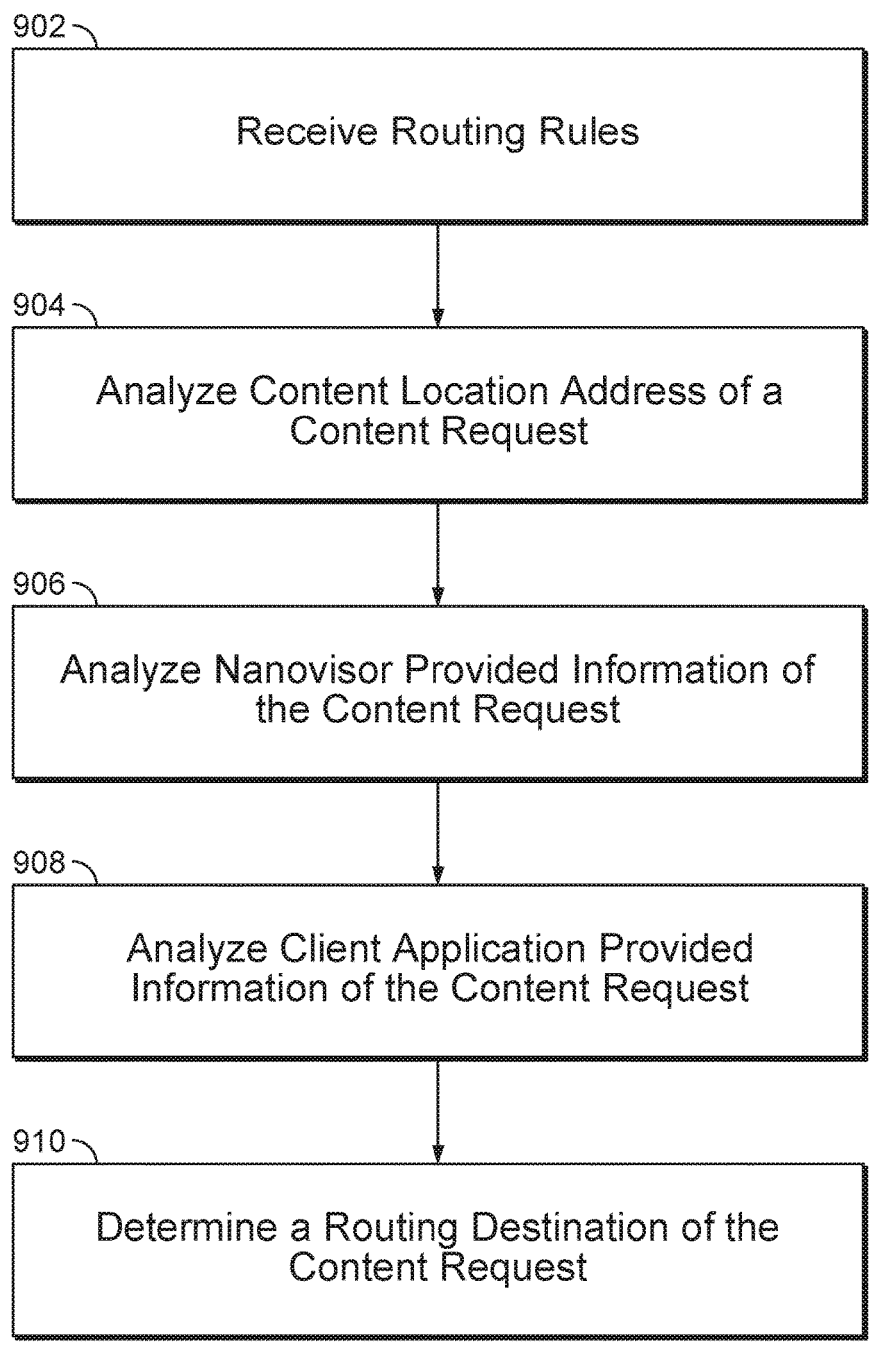
FIG. 9 is a flowchart illustrating an embodiment of a process for analyzing a content request.

FIG. 9 is a flowchart illustrating an embodiment of a process for analyzing a content request. The process of FIG. 9 may be at least in part implemented on a component of a prioritized content delivery system (e.g., a component of prioritized content delivery systems 412, 414, or 416) or a component/device connected to a prioritized content delivery system. In some embodiments, the process of FIG. 9 is at least in part implemented on a receiver component (e.g., application level load balancer) of a prioritized content delivery system that analyzes an incoming request (e.g., analyzing requests coming through port 80) to determine whether the request should be handled by the prioritized content delivery system or redirected to another content delivery system. In some embodiments, at least a portion of the process of FIG. 9 is included in step 804 of FIG. 8.

At 902, routing rules are received. The routing rules specify delivery of which type of content can be improved by a prioritized content delivery system and/or should be handled by the prioritized content delivery system. In some embodiments, the routing rules include a list of types of content to be routed to the prioritized content delivery system. In various embodiments, at least a portion of the routing rules are received from one or more of the following: a component of the prioritized content delivery system, an administrator of the prioritized content delivery system, a nanovisor, a normal content delivery system, and any other network component configuring a prioritized content delivery system. The routing rules may be received periodically and/or dynamically. Updates to the routing rules may be received. In some embodiments, the routing rules are preconfigured.

At 904, the content location address of a content request is analyzed. In some embodiments, analyzing the content location address includes analyzing a URI/URL of a content request to at least in part determine a content type of the requested content. For example, a filename, a domain name, a parameter, a query string, and any other component of the content location address may be analyzed to determine whether it matches a known mapping to a content type. In some embodiments, the content location address is searched/parsed to determine whether it includes a component that matches a known identifier of a content type. In some embodiments, if a matching content type is found, the process proceeds to 910.

At 906, nanovisor provided information of the content request is analyzed. In some embodiments, the nanovisor information includes information determined in 604 and/or encoded in 608 of FIG. 6. For example, information encoded in a parameter/query string of a URI/URL of the requested content by a nanovisor (e.g., nanovisor 406 of FIG. 4) is analyzed to at least in part determine a content type of the requested content. The nanovisor provided information may specify an identifier of a type of content of the requested content. In some embodiments, nanovisor provided information may not exist and is not analyzed. In some embodiments, if a content type identifier is determined using the nanovisor provided information, the process proceeds to 910.

At 908, client application provided information of the content request is analyzed. For example, information encoded by an application (e.g., web browser) requesting the requested content is analyzed. In some embodiments, the client application provided information is included in a protocol header such as an HTTP header. In some embodiments, client application provided information includes accept-encoding information. In some embodiments, analyzing the client application provided information includes determining a content type of the requested content. The client application provided information may specify an identifier of a type of content of the requested content. In some embodiments, client application provided information may not exist and is not analyzed. In some embodiments, if a content type identifier is determined using the client application provided information, the process proceeds to 910.

At 910, a routing destination of the content request is determined. In some embodiments, the routing destination is determined using the received routing rules and a result of the one or more analysis performed in 904, 906, and/or 908. For example, the routing rules specify a destination of a content request based on a requested content type and the content type is determined based at least in part on the analysis performed in 904, 906, and/or 908. In some embodiments, determining the routing destination includes determining whether the delivery of the requested content can be improved by a prioritized content delivery system. In some embodiments, determining the routing destination includes determining whether the request should be further routed to a prioritized content delivery system or redirected to a normal content delivery system.

Figure 10:
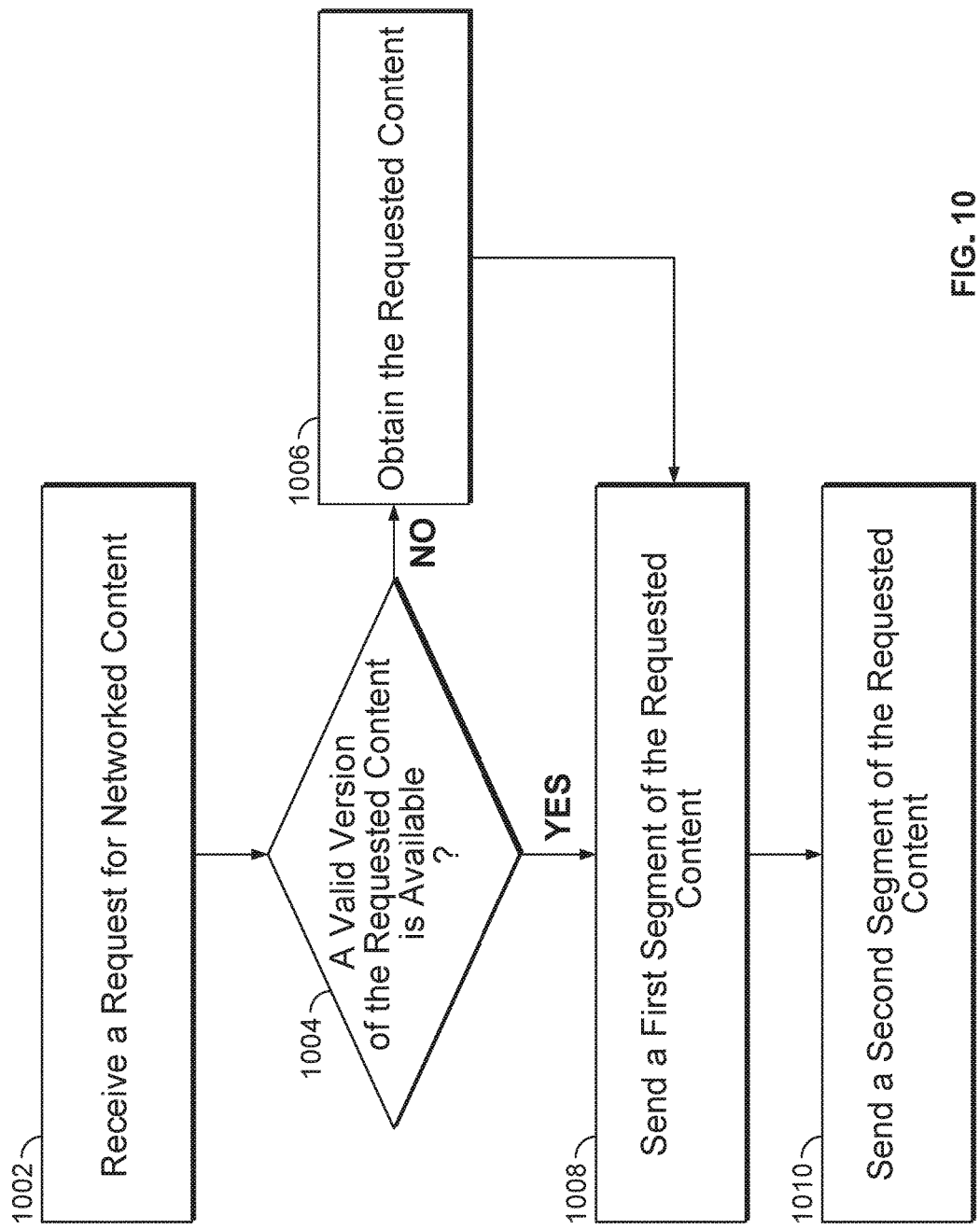
FIG. 10 is a flowchart illustrating an embodiment of a process for providing requested content.

FIG. 10 is a flowchart illustrating an embodiment of a process for providing requested content. The process of FIG. 10 may be at least in part implemented on a prioritized content delivery system (e.g., a component of prioritized content delivery systems 412, 414, or 416 of FIG. 4). In some embodiments, the process of FIG. 10 is implemented on a proxy server of a prioritized content delivery system that received a request sent in 806 of FIG. 8.

At 1002, a request for networked content is received. In some embodiments, the request includes the request routed in 806 of FIG. 8.

At 1004, it is determined whether a valid version of the requested content is available. For example, it is determined whether the content had been previously requested and processed to optimize delivery and/or is cached. In some embodiments, determining whether the valid version exists includes determining whether the preprocessed version is stored in a storage of a server (e.g., storage of a prioritized content delivery system). In some embodiments, determining whether the valid version exists includes determining whether a previously processed/cached version of the requested content is valid. For example, the previously processed/cached version of the requested content may have been updated since a previous processing. In some embodiments, a version of the requested content is not valid if a predetermined amount of time has passed since when the preprocessed version had been processed.

If at 1004 it is determined that a valid preprocessed version of the requested content is not available, at 1006, the requested content is obtained. In some embodiments, obtaining the requested web content includes obtaining content that can be at least in part used to provide the requested content. For example, prioritized content delivery system 412 receives the web content request from web browser 402 and prioritized content delivery system 412 requests and obtains at least a portion of the requested content from normal content delivery system 408 of FIG. 4. In some embodiments, the requested content is received from a plurality of content providers/sources. In some embodiments, the requested content is obtained by a proxy server.

If at 1004 it is determined that a valid preprocessed version of the requested content is available, at 1008, a first segment of the requested content is sent. For example, the first segment may be the first scan of a progressive JPEG image, containing the lower frequency components of a progressive JPEG image. A receiver of the content (e.g., a nanovisor) may use method API calls to refresh the dummy node in a DOM tree with the received image segment, and the initial lower quality image may be rendered on the screen.

At 1010, a second segment of the requested content is sent. For example, the second segment may be a second scan of a progressive JPEG image, containing the higher frequency components of the progressive JPEG image. The receiver of the content (e.g., a nanovisor) may use method API calls to refresh the dependent resource node in the DOM tree with the received content (e.g., to allow a sharper and higher quality image to be rendered on the screen).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a communication interface configured to receive webpage content referring to a network content using a URI address;
    a processor configured to:
        receive a request for the network content referred in the webpage content by the URI address, wherein the request is received from a load balancer that has load balanced the request at least in part by analyzing network layer information associated with the request;
        determine, using application level data associated with the request, whether delivery of the network content can be improved by a prioritized content delivery system, including:
            identify a type of the requested network content; and
            determine that, based on the type of the requested network content, the requested network content can be improved by the prioritized content delivery system; and
        route the request for the network content to the prioritized content delivery system or a normal content delivery system based at least in part on the determination of whether delivery of the network content can be improved by a prioritized content delivery system, wherein routing the request for the network content to the prioritized content delivery system or the normal content delivery system includes using the same URI address regardless of whether the network content is to be routed to the prioritized content delivery system or the normal content delivery system and selecting between the prioritized content delivery system and the normal content delivery system to generate a modified URI address; and
    a virtualization engine configured to at least one of: virtualize static and dynamic interactions and intercept static and dynamic interactions, with a document object model of a browser associated with the system.

2. The system of claim 1, wherein determining whether delivery of the content can be improved by the prioritized content delivery system includes determining which application requested the network content.

3. The system of claim 1, wherein the request for network content is routed to the prioritized content delivery system in the event the determination indicates that delivery of the network content can be improved by the prioritized content delivery system.

4. The system of claim 1, wherein the request for network content is routed to the normal content delivery system in the event the determination indicates that delivery of the network content cannot be improved by the prioritized content delivery system.

5. The system of claim 1, wherein the application level data includes OSI model layer 7 data.

6. The system of claim 1, wherein the normal content delivery system includes an origin server of an original content source of the request.

7. The system of claim 1, wherein the prioritized content delivery system is able to proxy content from the normal content delivery system.

8. The system of claim 1, wherein the prioritized content delivery system optimizes delivery of a certain type of content that is also available via the normal content delivery system.

9. The system of claim 1, wherein the request is associated with a virtualized document object model of a webpage attempted to be rendered by a requestor of the request.

10. The system of claim 1, wherein routing the request includes using a received routing rule selected based at least in part on the determination of whether delivery of the network content can be improved by a prioritized content delivery system.

11. The system of claim 1, wherein the determination of whether delivery of the network content can be improved by a prioritized content delivery system includes analyzing a content location address of the request.

12. The system of claim 1, wherein the determination of whether delivery of the network content can be improved by a prioritized content delivery system includes analyzing a location address parameter encoded by a document object model virtualization client of a requestor of the request.

13. The system of claim 12, wherein the document object model virtualization client is a nanovisor.

14. The system of claim 1, wherein the determination of whether delivery of the network content can be improved by a prioritized content delivery system includes analyzing a web browser provided information.

15. The system of claim 1, wherein the determination of whether delivery of the network content can be improved by a prioritized content delivery system includes analyzing an accept-encoding information.

16. The system of claim 1, wherein in the event the request for network content is routed to the prioritized content delivery system based at least in part on the determination of whether delivery of the network content can be improved by a prioritized content delivery system, the prioritized content delivery system segments the requested content into a plurality of segments and provides a segment of the segments in response to the request.

17. The system of claim 1, wherein the identification of the type of the requested network content includes classifying the requested network content as at least one of: an image file and an executable file.

18. A method, comprising:
receiving webpage content referring to a network content using a URI address;
receiving a request for the network content referred in the webpage content by the URI address, wherein the request is received from a load balancer that has load balanced the request at least in part by analyzing network layer information associated with the request;
using a processor to determine, using application level data associated with the request, whether delivery of the network content can be improved by a prioritized content delivery system, including:
identifying a type of the requested network content; and
determining that, based on the type of the requested network content, the requested network content can be improved by the prioritized content delivery system;
routing the request for the network content to the prioritized content delivery system or a normal content delivery system based at least in part on the determination of whether delivery of the network content can be improved by a prioritized content delivery system, wherein routing the request for the network content to the prioritized content delivery system or the normal content delivery system includes using the same URI address regardless of whether the network content is to be routed to the prioritized content delivery system or the normal content delivery system and selecting between the prioritized content delivery system and the normal content delivery system to generate a modified URI address; and
at least one of: virtualizing static and dynamic interactions and intercepting static and dynamic interactions, with a document object model of a browser associated with the system.

19. A computer program product, the computer program product being embodied in a non-transitory computer readable storage medium and comprising computer instructions for:
receiving webpage content referring to a network content using a URI address;
receiving a request for the network content referred in the webpage content by the URI address, wherein the request is received from a load balancer that has load balanced the request at least in part by analyzing network layer information associated with the request;
determining, using application level data associated with the request, whether delivery of the network content can be improved by a prioritized content delivery system, including:
identifying a type of the requested network content; and
determining that, based on the type of the requested network content, the requested network content can be improved by the prioritized content delivery system;
routing the request for the network content to the prioritized content delivery system or a normal content delivery system based at least in part on the determination of whether delivery of the network content can be improved by a prioritized content delivery system, wherein routing the request for the network content to the prioritized content delivery system or the normal content delivery system includes using the same URI address regardless of whether the network content is to be routed to the prioritized content delivery system or the normal content delivery system and selecting between the prioritized content delivery system and the normal content delivery system to generate a modified URI address; and
at least one of: virtualizing static and dynamic interactions and intercepting static and dynamic interactions, with a document object model of a browser associated with the system.

* * * * *